(12) United States Patent
Mizoroki et al.

(10) Patent No.: US 7,876,284 B2
(45) Date of Patent: Jan. 25, 2011

(54) ANTENNA SUBSTRATE FOR NON-CONTACT COMMUNICATION APPARATUS AND NON-CONTACT COMMUNICATION APPARATUS

(75) Inventors: Takashi Mizoroki, Kanagawa (JP); Kohei Mori, Tokyo (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 12/237,538

(22) Filed: Sep. 25, 2008

(65) Prior Publication Data

US 2009/0091501 A1    Apr. 9, 2009

(30) Foreign Application Priority Data

Oct. 3, 2007    (JP)    ............... 2007-260154

(51) Int. Cl.
*H01Q 1/36*    (2006.01)
(52) U.S. Cl. ............... 343/895; 343/867; 343/742
(58) Field of Classification Search ............. 343/895, 343/866, 867, 741, 742, 702
See application file for complete search history.

(56) References Cited

U.S. PATENT DOCUMENTS

| | | | |
|---|---|---|---|
| 6,809,703 B2 * | 10/2004 | Serra | 343/895 |
| 6,839,963 B1 * | 1/2005 | Haghiri-Tehrani et al. | 29/852 |
| 2003/0076236 A1 * | 4/2003 | Cooksey et al. | 340/686.6 |

FOREIGN PATENT DOCUMENTS

JP    2006-285709    10/2006

* cited by examiner

*Primary Examiner*—HoangAnh T Le
(74) *Attorney, Agent, or Firm*—SNR Denton US LLP (57) ABSTRACT

An antenna substrate for a non-contact communication apparatus includes a support substrate and an antenna coil provided on or inside of the support substrate. The antenna coil has a first opening and an auxiliary coil. The auxiliary coil has a second opening which has an opening area smaller than the first opening. The auxiliary coil is insulated and isolated from the antenna coil, and arranged so that the second opening is opposed to a part of the first opening when viewed from a direction orthogonal to a surface of the support substrate.

6 Claims, 6 Drawing Sheets

ANTENNA SUBSTRATE FOR NON-CONTACT COMMUNICATION APPARATUS AND NON-CONTACT COMMUNICATION APPARATUS

CROSS-REFERENCE TO RELATED APPLICATIONS

The present application claims benefit of priority of Japanese patent Application No. 2007-260154 filed in the Japanese Patent Office on Oct. 3, 2007, the entire disclosure of which is incorporated herein by reference.

BACKGROUND OF THE INVENTION

1. Field of the Invention

The present invention relates to an antenna substrate for a non-contact communication apparatus provided with two coils insulated and isolated from each other.

2. Description of Related Art

In a short-range wireless communication of inductor coupling type, non-contact communication is performed by bringing two antenna coils close to each other so as to establish a magnetic coupling between these two antenna coils. However, when a metal substance is arranged on the back side of either one of these antenna coils, the metal substance becomes closer to the other antenna coil as these two antenna coils are brought closer to each other. Consequently, the effective antenna inductance of the other antenna coil is gradually lowered due to the eddy current generated on the surface of the metal substance. Irrespective of whether these two antenna coils are located close to each other, communication characteristics may be considerably deteriorated, or the non-contact communication apparatuses may be unable to communicate.

Accordingly, measures of providing a thick magnetic sheet between a metal substance and the back side of the antenna coil to reduce the eddy current generated in the metal substance, has been generally taken (see, for example, Japanese Unexamined Patent Application Publication No. 2006-285709).

SUMMARY OF THE INVENTION

However, the magnetic sheet is generally expensive, which causes a cost increase of the device. Further, the insertion of the thick magnetic sheet leads to an increase in an overall thickness of the device.

It is desirable to provide an antenna substrate for a non-contact communication apparatus and a non-contact communication apparatus which enable a stable non-contact communications with closely arranged antenna coils by suppressing the fluctuations in antenna characteristics due to the distance between antennas, without using any magnetic sheet.

In accordance with one embodiment of the present invention, there is an antenna substrate for a non-contact communication apparatus which includes a support substrate and an antenna coil. The antenna coil is provided on or inside of the support substrate and has a first opening and an auxiliary coil which has an opening area smaller than that of the first opening. The auxiliary coil is insulated and isolated from the antenna coil, and arranged so that the second opening is opposed to a part of the first opening when viewed from a direction orthogonal to a surface of the support substrate.

In accordance with another embodiment of the present invention, there is provided a non-contact communication apparatus which includes an antenna substrate and a drive circuit. The antenna substrate includes a support substrate and an antenna coil. The antenna coil is provided on or inside of the support substrate and has a first opening and an auxiliary coil which has an opening area smaller than that of the first opening. The auxiliary coil is insulated and isolated from the antenna coil, and arranged so that the second opening is opposed to a part of the first opening when viewed from a direction orthogonal to a surface of the support substrate. The drive circuit applies a predetermined signal to the antenna coil.

In the antenna substrate for a non-contact communication apparatus and the non-contact communication apparatus according to embodiments of the invention, the auxiliary coil having the opening having a smaller opening area than the opening of the antenna coil is insulated and isolated from the antenna coil, and arranged so that the second opening is opposed to a part of the first opening when viewed from a direction orthogonal to the surface of the support substrate. It is therefore capable of reducing the total amount of magnetic fields flowing generated from the antenna coil into the second opening of the auxiliary coil when the predetermined signal is applied to the antenna coil. This enables a reduction of the magnetic coupling between the antenna coil and the auxiliary coil, whereby the shortening the communicable distance between the antenna and the third coil can be suppressed. By properly adjusting the resonance frequency of the antenna coil and the resonance frequency of the auxiliary coil, for example, when a metal substance is arranged on a back surface of the support substrate and the antenna coil is closely arranged on the surface of the support substrate while applying electric power and a transmission signal to the antenna coil, an amount of reduction in an effective self-inductance of the third antenna coil due to an influence of the metal substance can be cancelled by increasing the effective self-inductance of the third antenna coil due to an influence of the auxiliary coil.

Thus, the antenna substrate for a non-contact communication apparatus and the non-contact communication apparatus according to embodiments of the invention, the auxiliary coil having the opening having a smaller opening area than the opening of the antenna coil is insulated and isolated from the antenna coil and arranged so that the second opening is opposed to a part of the first opening when viewed from the direction orthogonal to the surface of the support substrate. As a result, by properly adjusting the respective resonance frequencies of the antenna coil and the auxiliary coil, the fluctuations in antenna characteristics due to the distance between antennas can be suppressed without using any magnetic sheet. As a result of this, a stable non-contact communication with antenna coil which is closely arranged can be performed.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

Hereinbelow, embodiments of the invention will be described in detail with reference to the accompanying drawings.

Figure 1:
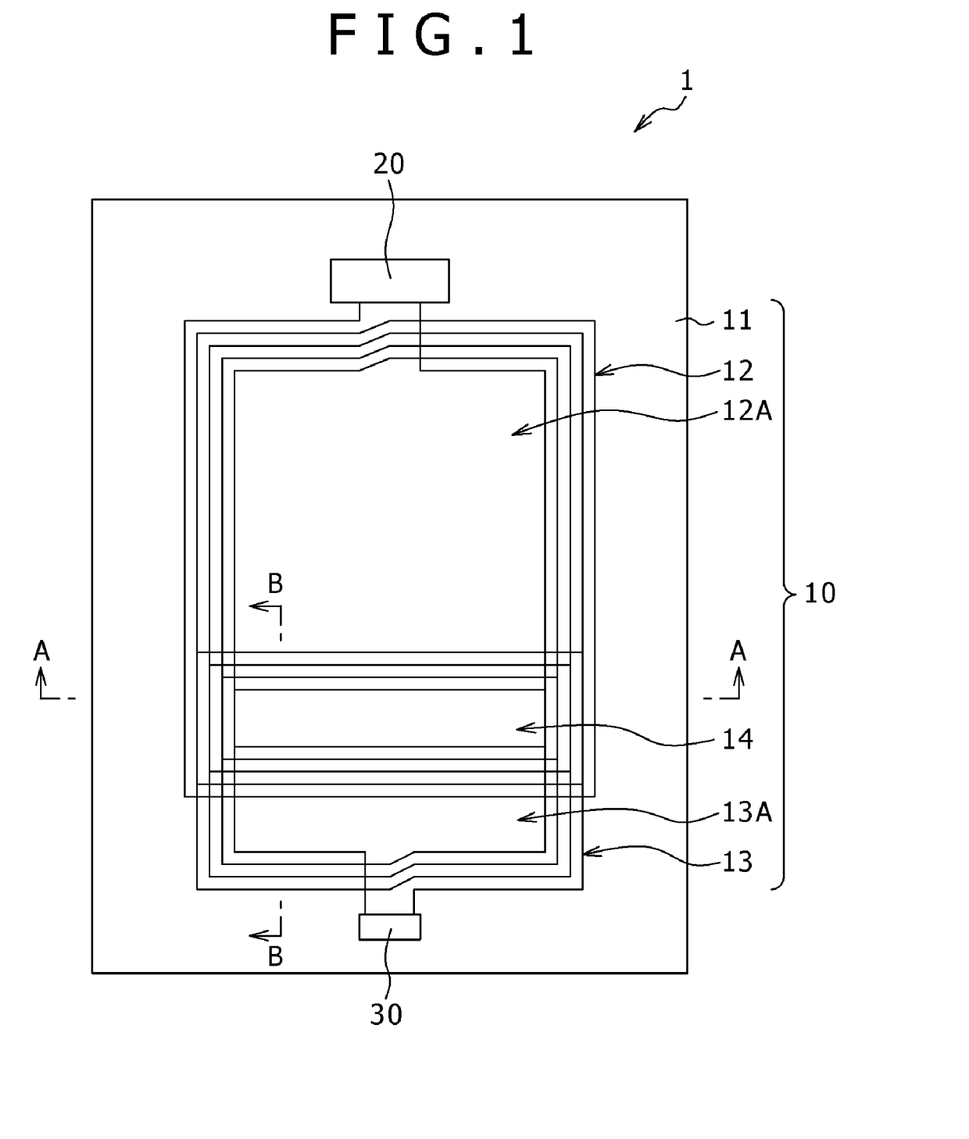
FIG. 1 is a plan view showing the surface configuration of a non-contact communication apparatus according to an embodiment of the invention.
Figure 2A:
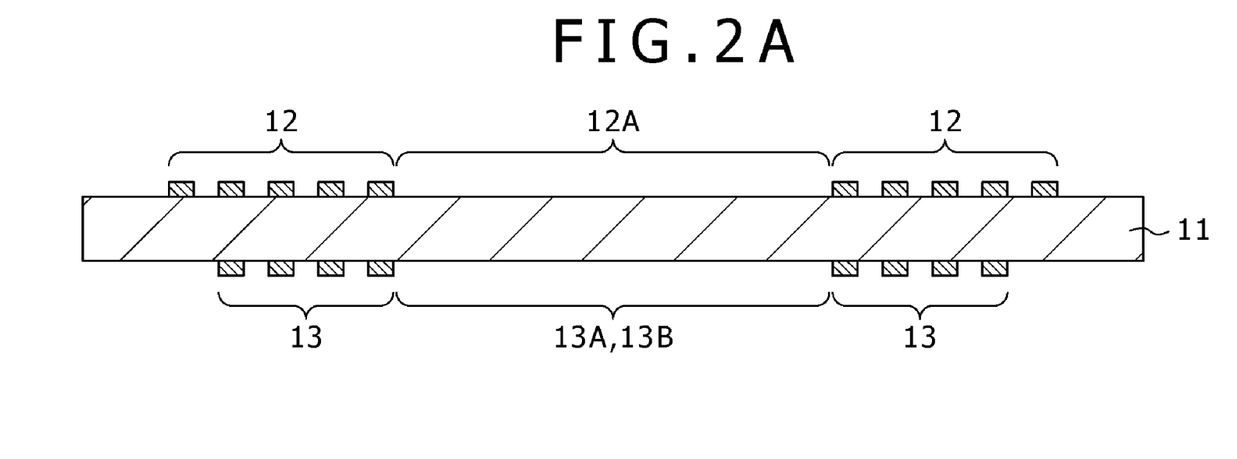
FIGS. 2A and 2B are views showing the cross-sectional configurations of the non-contact communication apparatus of FIG. 1.
Figure 2B:
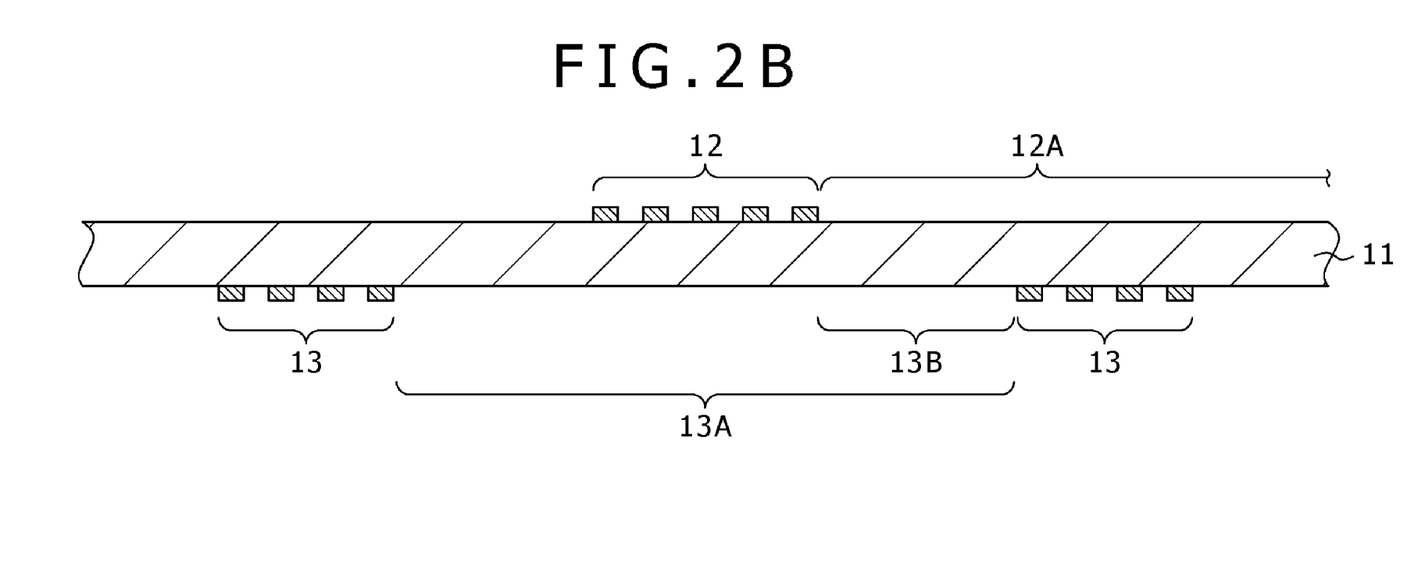

A non-contact communication apparatus 1 according to an embodiment of the invention will now be described. FIG. 1 shows an upper surface configuration of the non-contact communication apparatus 1 of the present embodiment. FIG. 2A shows the cross-sectional configuration of the non-contact communication apparatus 1 taken along the line A-A in FIG. 1, viewed from the direction of the appended arrows. FIG. 2B shows the cross-sectional configuration of the non-contact communication apparatus 1 taken along the line B-B in FIG. 1, viewed from the direction of the appended arrows.

The non-contact communication apparatus 1 includes an integrated circuit (IC) chip 20 and a capacitance element 30 on an antenna substrate 10 which are formed on an antenna substrate 10 (an antenna substrate for a non-contact communication apparatus). Examples thereof include reader/writer used along with a card-type antenna device.

The antenna substrate 10 includes an antenna coil 12 and an auxiliary coil 13 on a support substrate 11 or inside of the support substrate 11. Although FIG. 1 illustrates an example in which the antenna coil 12 is arranged on one surface of the support substrate 11 and the auxiliary coil 13 is arranged on the other surface of the support substrate 11, these two coils may be insulated and isolated from each other and arranged on a common surface of the support substrate 11.

The support substrate 11 is formed from a flexible film composed of polyester, cellophane, PET, polyimide or the like, an electronic substrate composed of glass epoxy or the like, or an insulating material such as paper. The support substrate 11 supports the antenna coil 12 and the auxiliary coil 13, and they are physically isolated and electrically insulated from each other.

The antenna coil 12 is, for example, a flat coil formed by winding wire made of a metal material such as copper or aluminum by a predetermined number of turns. An opening 12A is formed inside the wound wire. Both ends of the wire constituting the antenna coil 12 are connected to the IC chip 20, from which electric power and a transmission signal are supplied to the antenna coil 12.

The auxiliary coil 13 is an inductor having, for example, approximately 10 nH to 100 µH, more specifically a flat coil formed by winding wire made of a metal material such as copper or aluminum by a predetermined number of turns. An opening 13A is formed inside the wound wire. The auxiliary coil 13 is provided independently from the antenna coil 12, and is insulated and isolated from the antenna coil 12.

Both ends of the wire constituting the auxiliary coil 13 are connected to the capacitance element 30. The auxiliary coil 13 and the capacitance element 30 constitute a resonator. The capacitance element 30 needs not always be connected to the auxiliary coil 13. The parasitic capacitance generated by the wire constituting the auxiliary coil 13 may be used instead of the capacitance element 30. The winding direction of the auxiliary coil 13 may be identical or opposite to the winding direction of the antenna coil 12.

Figure 3:
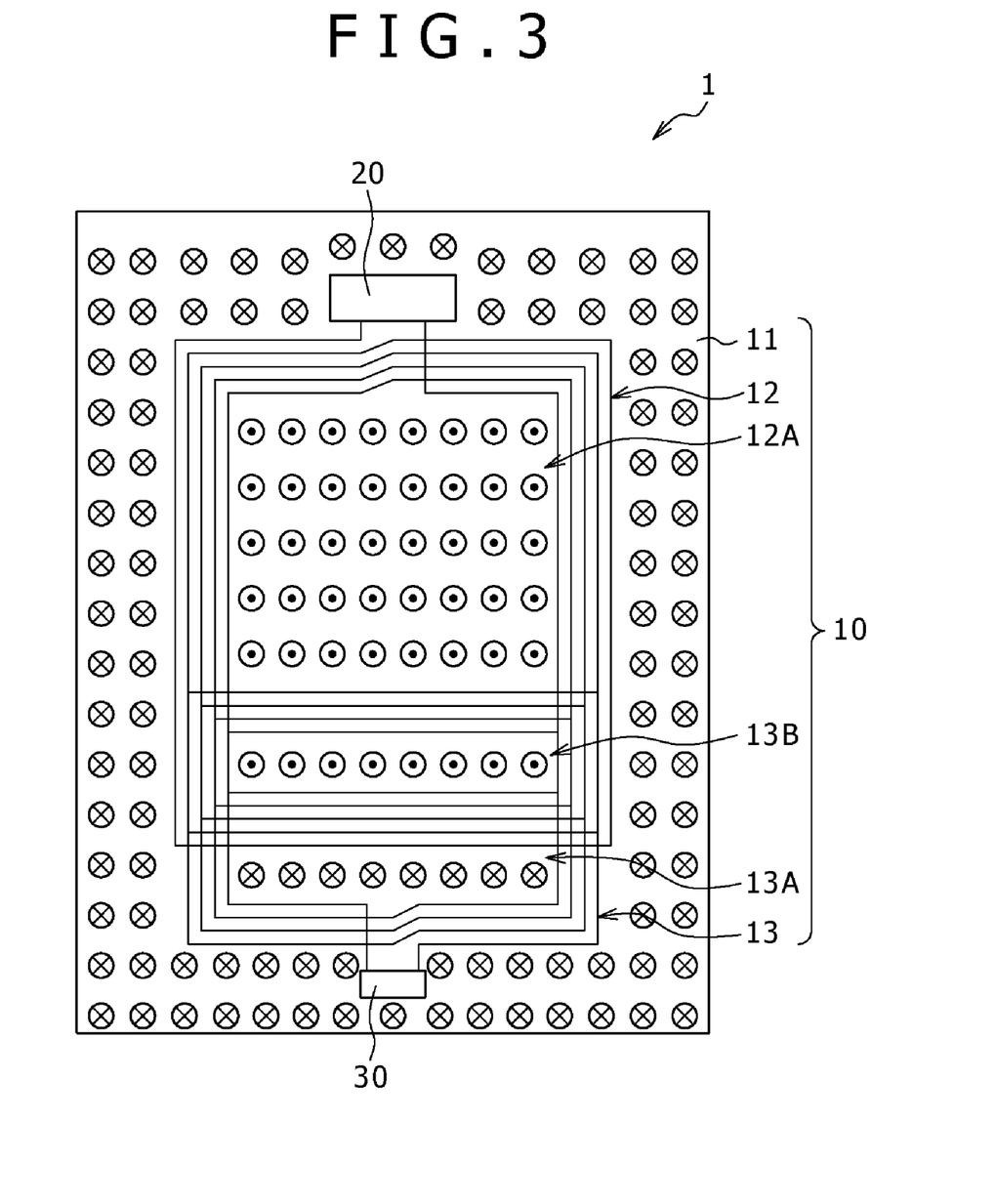
FIG. 3 is a conceptual illustration for explaining the magnetic fields generated when electric power and a transmission signal are supplied to the antenna coils in FIG. 1.

The auxiliary coil 13 is arranged so that the opening 13A is opposed to a part of the opening 12A when viewed from a direction orthogonal to the surface of the support substrate 11. Preferably, the ratio of the area of a region in which the opening 12A and the opening 13A are opposed to each other (an opposing region 14) to the opening area of the opening 13A is substantially 50%. The reason for this is as follows. That is, when electric power and a transmission signal are supplied to the antenna coil 12, the carrier waves (alternating magnetic fields) generated from the antenna coil 12 are oriented in opposite direction, for example, between the opening 12A and the outside of the antenna coil 12, as shown in FIG. 3. In the alternating magnetic fields, the alternating magnetic field passing through the opening 12A and the alternating magnetic field passing through the outside of the antenna coil 12 pass through the opening 13A of the auxiliary coil 13 by substantially the same amount. This is most efficient configuration in reducing the magnetic coupling between the antenna coil 12 and the auxiliary coil 13. As a result, the provision of the auxiliary coil 13 suppresses the decrease of the communicable distance between the antenna coil 12 and a later-described antenna coil 112.

Figure 4:
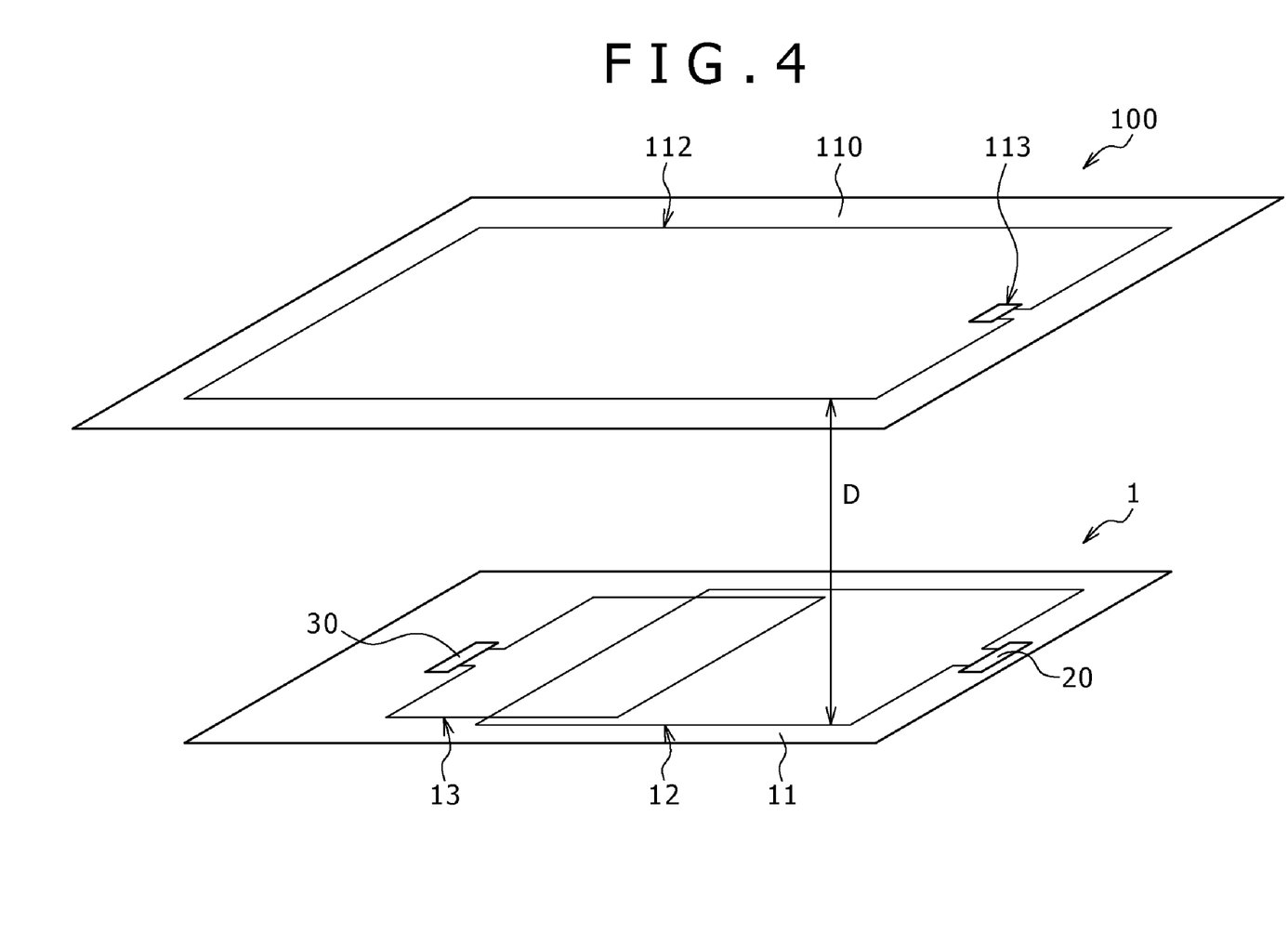
FIG. 4 is a perspective view of the non-contact communication apparatus and an opposed card in FIG. 1.

As shown in simplified form in FIG. 4, the non-contact communication apparatus 1 is generally used along with a card-type antenna device (an opposed card 100) in a pair. The non-contact communication apparatus 1 is, for arranged spaced apart a predetermined distance D from the antenna coil 112 of the opposed card 100 formed by provision an antenna coil 112 and an IC chip 113 in a support substrate 100. The opposed card 100 is supplied an electric power by electromagnetic induction through electromagnetic waves (alternating magnetic fields) generated from the antenna coil 12 of the non-contact communication apparatus 1 and is modulated data signals are superimposed on the carrier waves, to perform reading/writing of data. In FIG. 4, for sake of simplicity, the specific configurations of the antenna coil 12, the auxiliary coil 13, and the antenna coil 112 are omitted.

The communication frequency used during transmitting/receiving of data between the non-contact communication apparatus 1 and the opposed card 100 is, for example, 13.56 MHz, and the magnetic field strength in this communication frequency needs to be high enough to permit communication at a position apart from the non-contact communication apparatus 1 by a predetermined distance D. Accordingly, the resonance frequency of the opposed card 100 side is preferably equal to the communication frequency or in the vicinity thereof. The resonance frequency of the non-contact communication apparatus 1 side (specifically, the resonance frequency of the antenna coil 12) is preset to the communication frequency or the vicinity thereof.

However, the resonance frequency of the opposed card 100 side readily varies due to the influence of the external environment. In the present embodiment, assuming that a metal substance is disposed to closely contacts the back surface of the antenna coil 12 (for example, in the case of locating the metal constituting the casing of the reader/writer on the back surface of the antenna coil 12), measures are taken to reduce the influence due to the metal substance.

Generally, in a known-type non-contact communication apparatus having no auxiliary coil, when a metal substance is disposed to closely contacts the back surface of the antenna coil of the non-contact communication apparatus, the metal substance is brought near an antenna coil 112 as the antenna coil 12 and the antenna coil 112 are brought near each other. Consequently, under the influence of the metal substance, the effective self-inductance of the antenna coil 112 in the communication frequency is lowered, and the resonance of the antenna coil 112 shifts into the high-frequency side. As a result, in the known-type non-contact communication apparatus, regardless of whether the antenna coil 12 and the antenna coil 112 are located close to each other, communication characteristics may be considerably deteriorated, or the non-contact communication apparatuses may be unable to communicate.

On the other hand, in the present embodiment, by providing an auxiliary coil 13 in the non-contact communication apparatus 1, when a metal substance is provided on the back surface of the support substrate 10 and the antenna coil 112 is arranged in proximity to the surface of the support substrate 10 while applying electric power and a transmission signal to the antenna coil 112, an amount of reduction in the effective self-inductance of the antenna coil 112 caused by the influence of the metal substance 3 is cancelled by increasing the effective self-inductance of the antenna coil 112 caused by the influence of the auxiliary coil 13.

The following is specific measures, by using the auxiliary coil 13, of cancelling the amount of reduction in the effective self-inductance of the antenna coil 112 due to the influence of the metal substance, by increasing the effective self-inductance of the antenna coil 112 due to the influence of the auxiliary coil 13.

Figure 5A:
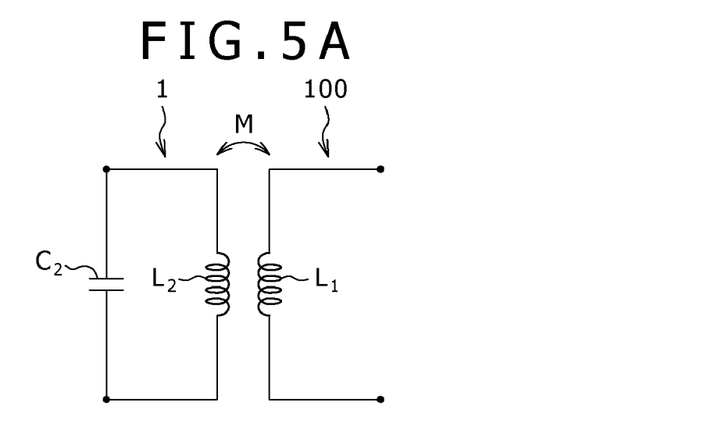
FIGS. 5A and 5B are a circuit diagram of the non-contact communication apparatus and the opposed card in FIG. 1, and an equivalent circuit diagram thereof, respectively.
Figure 5B:
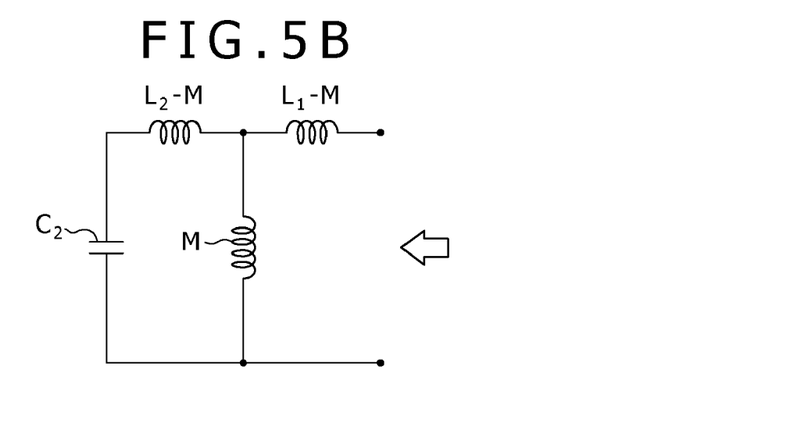

FIG. 5A shows the circuit of the auxiliary coil 13, the capacitance element 30 and the antenna coil 112. FIG. 5B shows the equivalent circuit of the circuit of FIG. 5A. In FIGS. 5A and 5B, $L_1$ is the self-inductance of the antenna coil 112, $L_2$ is the self-inductance of the auxiliary coil 13, and $C_2$ is the capacitance of the capacitance element 30. When the parasitic capacitance of the auxiliary coil 13 is used instead of the capacitance element 30, $L_2$ is the self-inductance of the parasitic capacitance.

From FIG. 5B, the effective impedance of the auxiliary coil 13, the capacitance element 30 and the antenna coil 112 when viewed from the antenna coil 112 side (i.e., the effective impedance of the antenna coil 112) Z can be expressed by the following equation (1):

$$Z = \cfrac{1}{\cfrac{1}{jw(L_2 - M) + \cfrac{1}{jwC_2}} + \cfrac{1}{jwM}} + jW(L_1 - M) \qquad (1)$$

$$= \frac{jwM\{1 - w^2 C_2(L_2 - M)\}}{1 - w^2 C_2 L_2} + jw(L_1 - M)$$

$$= jw\left(\frac{w^2 C_2 L_2}{1 - w^2 C_2 L_2} + L_1\right)$$

It can be seen from equation (1) that an increase amount $\Delta L_\alpha$ in the effective inductance of the antenna coil 112, caused by providing the auxiliary coil 13 and the capacitance element 30, corresponds to the first item at the right side of equation (1), as shown by the following equation (2):

$$\Delta L_\alpha = \frac{w^2 M^2 C_2}{1 - w^2 C_2 L_2} \qquad (2)$$

In this case, it might be better that the magnitude of the increase amount $\Delta L_\alpha$ is at least positive; however, it is preferable that the magnitude is equal or substantially equal to a decrease amount $\Delta L_\beta$ in the effective inductance of the antenna coil 112 due to the influence of the metal substance, as shown in the following equation (3):

$$\Delta L_\beta \approx \frac{w^2 M^2 C_2}{1 - w^2 C_2 L_2} \qquad (3)$$

Letting $f_0$ be the resonance frequency of a resonator constructed from the auxiliary coil 13 and the capacitance element 30, $f_0$ can be expressed by the following equation (4):

$$f_0 = \frac{1}{2\pi\sqrt{C_2 L_2}} \qquad (4)$$

Then, by modifying equation (4), $C_2 L_2$ can be expressed by the following equation (5):

$$C_2 L_2 = \frac{1}{(2\pi f_0)^2} = \frac{1}{w_0^2} \qquad (5)$$

By substituting equation (5) into the $C_2 L_2$ in equation (3), the increase amount $\Delta L_\alpha$ can be expressed by the following equation (6):

$$\Delta L_\alpha = \frac{w^2 M^2 C_2}{1 - \left(\frac{w}{w_0}\right)^2} = \frac{w^2 M^2 C_2}{1 - \left(\frac{f}{f_0}\right)^2} \qquad (6)$$

where f is the resonance frequency (the communication frequency) of the antenna coil 12.

Equation (6) shows that the increase amount $\Delta L_\alpha$ becomes negative when the resonance frequency $f_0$ is smaller than the resonance frequency f, thereby failing to cancel the decrease mount $\Delta L_\beta$, and the increase amount $\Delta L_\alpha$ becomes positive when the resonance frequency $f_0$ is larger than the resonance frequency f. As a result, by properly adjusting the increase amount $\Delta L_\alpha$, the decrease amount $\Delta L_\beta$ can be cancelled by the decrease amount $\Delta L_\alpha$.

Thus, in the non-contact communication apparatus 1 of the present embodiment, the auxiliary coil 13 is insulated and isolated from the antenna coil 12, and the auxiliary coil 13 having the opening 13A having a smaller opening area than the opening 12A of the antenna coil 12 is arranged so that the opening 13A is opposed to a part of the opening 12A when viewed from a direction orthogonal to the surface of the support substrate 11. It is therefore capable of reducing the total amount of magnetic fields flowing generated from the antenna coil 12 into the opening 13A of the auxiliary coil 13 when the predetermined signal is applied to the antenna coil 12. This permits a reduction in the magnetic coupling between the antenna coil 12 and the auxiliary coil 13, thereby suppressing the decrease in the communicable distance between the antenna coil 12 and the antenna coil 112.

In the present embodiment, particularly when the ratio of the area of the opposed region 14 (the opposing area) to the opening area of the opening 13A is substantially 50%, little or no magnetic coupling between the antenna coil 12 and the auxiliary coil 13 occur, thereby eliminating the likelihood that the communicable the distance between the antenna coil 12 and the antenna coil 112 becomes short.

Further, in the present embodiment, the resonance frequency of the resonator constructed from the auxiliary coil 13 and the capacitance element 30 is configured to be greater than the resonance frequency of the antenna coil 12. Consequently, for example, when a metal substance is disposed on the back surface of the support substrate 10 and the antenna coil 112 is arranged in proximity to the front surface of the support substrate 10 while applying electric power and a transmission signal to the antenna coil 112, it becomes possible to cancel the decrease amount $\Delta L_\beta$ in the effective self-inductance of the antenna coil 112 due to the influence of the metal substance, by the increase amount $\Delta L_\alpha$ in the effective self-inductance of the antenna coil 112 due to the influence of the auxiliary coil 13.

Accordingly, the present embodiment enables the non-contact communication with the closely arranged antenna coil 112 without using any magnetic sheet. Alternatively, if a magnetic sheet is used, the thickness of the magnetic sheet can be reduced than that of the conventional one.

Example

An example of the non-contact communication apparatus 1 of the above embodiment will be described below.

In the example, the inductance of the antenna coil 12 was set to approximately 1.2 µH. The inductance of the antenna coil 112 of the opposed card 100 was set to approximately 1.2 µH. Accordingly, the resonance frequency (communication frequency) of the antenna coils 12 and 112 was set to approximately 13.56 MHz. The inductance of the auxiliary coil 13 was set to approximately 1.6 µH, and the capacitance of the capacitance element 30 was set to 82 µF. Accordingly, the resonance frequency $f_0$ of the resonator constructed from the auxiliary coil 13 and the capacitance element 30 was set to approximately 14 MHz (>13.56 MHz). The ratio of the area of the opposed region 14 (the opposing area) to the opening area of the opening 13A was substantially 50%.

Figure 6:
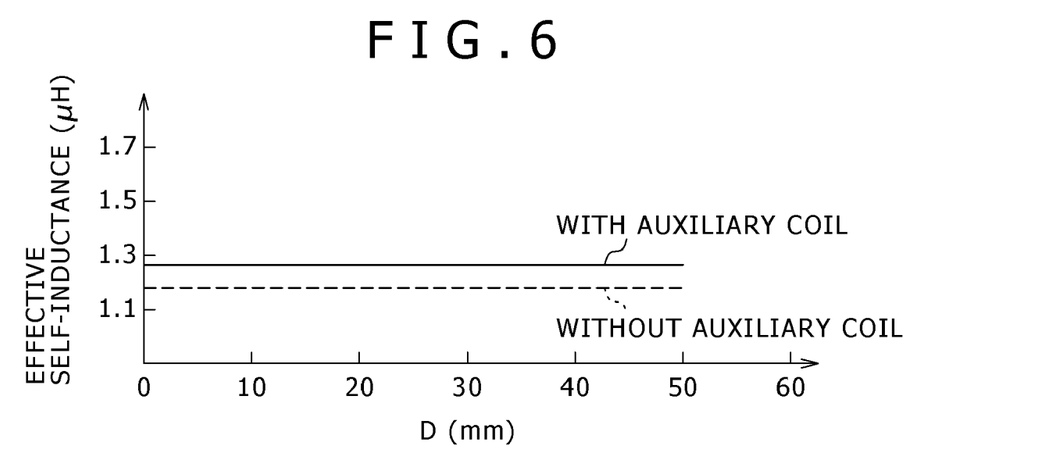
FIG. 6 is a characteristic diagram of the effective self-inductance of the non-contact communication apparatus according to an embodiment with respect to the distance between antennas.
Figure 7:
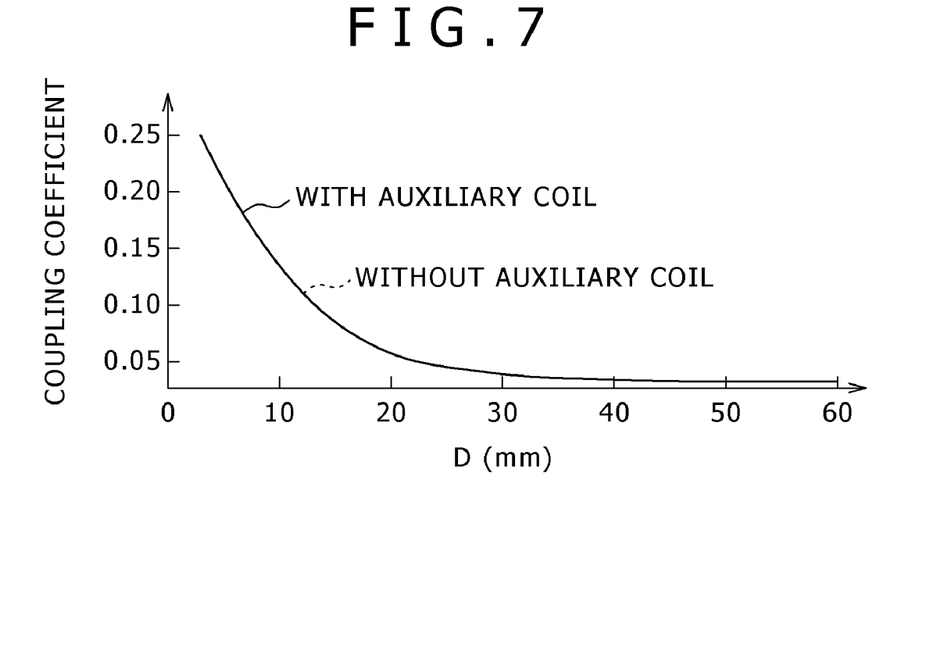
FIG. 7 is a characteristic diagram of the effective self-inductance of the non-contact communication apparatus and an opposed card in the embodiment with respect to the distance between antennas.
Figure 8:
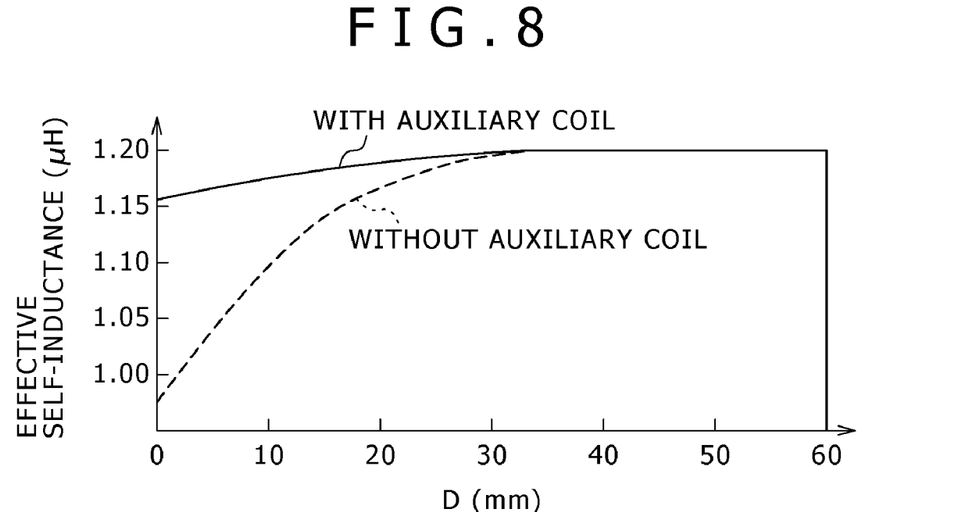
FIG. 8 is a characteristic diagram of the effective self-inductance of the opposed card in the embodiment with respect to the distance between antennas.

FIG. 6 shows the inductance of the non-contact communication apparatus 1 when the distance D between antennas is changed. FIG. 7 shows the coupling coefficient between the antenna coil 12 and the antenna coil 112 when the distance D between antennas is changed. FIG. 8 shows the effective inductance of the antenna coil 112 when the distance D between antennas is changed.

It can be seen from FIG. 6 that regardless of the existence of the auxiliary coil 13, the inductance of the non-contact communication apparatus 1 remains almost unchanged even when the distance D between antennas is changed. It can be seen from FIG. 7 that the coupling coefficient between the antenna coil 12 and the antenna coil 112 has little or no change between the provision of the auxiliary coil 13 and no provision of it. Consequently, the provision of the auxiliary coil 13 causes neither the coupling characteristic deterioration nor the decrease in the communicable distance between the antenna coil 12 and the antenna coil 112.

It can be seen from FIG. 8 that in the proximate region in which a distance D between antennas is not more than 30 mm, the provision of the auxiliary coil 13 considerably increases the effective inductance of the antenna coil 112, which is not significantly different from the effective inductance of the antenna coil 112 when the distance D between antennas is greater than 30 mm. That is, the provision of the auxiliary coil 13 eliminates the possibility that the communication characteristic will be considerably deteriorated and that the communication device will be rendered inoperable in the proximate region in which the distance D between antennas is not more than 30 mm.

Although there has been shown herein and described certain embodiments of the invention, it will be understood that many changes and modifications may be made therein without departing from the spirit or scope of the invention.

What is claimed is:

1. An antenna substrate for a non-contact communication apparatus, the antenna substrate comprising:
   a support substrate; and
   an antenna coil, provided on or inside of the support substrate, having a first opening and an auxiliary coil, the auxiliary coil having a second opening which has an opening area smaller than that of the first opening,
   wherein the auxiliary coil is insulated and isolated from the antenna coil, and arranged so that the second opening is opposed to a part of the first opening when viewed from a direction orthogonal to a surface of the support substrate.

2. The antenna substrate for a non-contact communication apparatus according to claim 1, wherein the auxiliary coil has a resonance frequency greater than that of the antenna coil.

3. The antenna substrate for a non-contact communication apparatus according to claim 1, wherein:
   when a predetermined signal is applied to the antenna coil while a metal substance is arranged on one surface of the support substrate and a third antenna coil is arranged closely on the other surface of the support substrate, the auxiliary coil has an inductance and a capacitance to cancel an amount of reduction in an effective self-inductance of the third antenna coil caused by an influence of the metal substance by increasing the effective self-inductance of the third antenna coil caused by an influence of the auxiliary coil.

4. The antenna substrate for a non-contact communication apparatus according to claim 1, wherein a ratio of an opposing area between the first opening and the second opening to an opening area of the second opening is substantially 50%.

5. The antenna substrate for a non-contact communication apparatus according to claim 1, wherein the auxiliary coil is electrically connected to a capacitance element, and the auxiliary coil and the capacitance constitute a resonance circuit.

6. A non-contact communication apparatus comprising:
   an antenna substrate; and
   a drive circuit,
   wherein the antenna substrate includes:
      a support substrate; and
      an antenna coil, provided on or inside of the support substrate, having a first opening and an auxiliary coil, the auxiliary coil having a second opening which has an opening area smaller than the first opening,
      wherein the auxiliary coil is insulated and isolated from the antenna coil, and arranged so that the second opening is opposed to a part of the first opening when viewed from a direction orthogonal to a surface of the support substrate, and
   wherein the drive circuit applies a predetermined signal to the antenna coil.

* * * * *